United States Patent [19]

Swanson et al.

[11] 4,066,372
[45] Jan. 3, 1978

[54] SLOTTED FLANGE CONNECTOR USEABLE IN A METHOD FOR REPLACING AN EXISTING UTILITY POLE WITHOUT DISTURBING HARDWARE MOUNTED THEREON

[75] Inventors: Harold V. Swanson, Morris Plains; Jorge E. Forero, Parsippany, both of N.J.

[73] Assignee: Interpace Corporation, Parsippany, N.J.

[21] Appl. No.: 673,408

[22] Filed: Apr. 5, 1976

[51] Int. Cl.² .................................................. F16B 2/02
[52] U.S. Cl. ........................................ 403/302; 52/40; 174/45 R
[58] Field of Search ................... 29/401; 403/302, 305, 403/312, 308, 313, 310, 309, 301, 339; 52/40, 726; 174/45 R

[56] References Cited

U.S. PATENT DOCUMENTS

| | | | |
|---|---|---|---|
| 367,584 | 8/1887 | Bartliff | 403/301 |
| 548,191 | 10/1895 | Griscom | 403/301 |
| 1,073,614 | 9/1913 | McDearmid | 403/305 X |
| 3,317,173 | 5/1967 | Williams | 52/726 X |
| 3,504,501 | 4/1970 | Fuentes, Jr. | 403/305 X |
| 3,606,409 | 9/1971 | Hawkins, Jr. | 403/301 |
| 3,911,548 | 10/1975 | Perry | 52/40 X |

FOREIGN PATENT DOCUMENTS 106,822  2/1875  France .................................. 403/312

Primary Examiner—Andrew V. Kundrat
Attorney, Agent, or Firm—Charles E. Baxley

[57] ABSTRACT

This disclosure teaches a slotted flange connector useable in a method for replacing an existing utility pole (usually wood), without disturbing hardware mounted thereon. As taught in U.S. Pat. No. 3,911,548, the utility pole includes a proximal section having a bottom end attached to the earth and a distal section having hardware mounted thereon. A new pole section (preferably of prestressed concrete) is attached to the earth approximately located and adapted for receiving the distal section. The distal section (with its hardware intact thereon) is severed from the proximal section. The distal section then is connected to project from the new pole section by means of the slotted flange connector disclosed herein. Closure plates complement each other to form a cylindrical enclosure about one of the pole sections. Preferably one of the closure plates is fixed and the other is moveable. The movement preferably is provided by means of bolts. The moveable closure plate has a terminal flange which engages a flange connected to the other pole section. Securing of the moveable plate is by means of bolts through slotted bolt holes.

6 Claims, 7 Drawing Figures

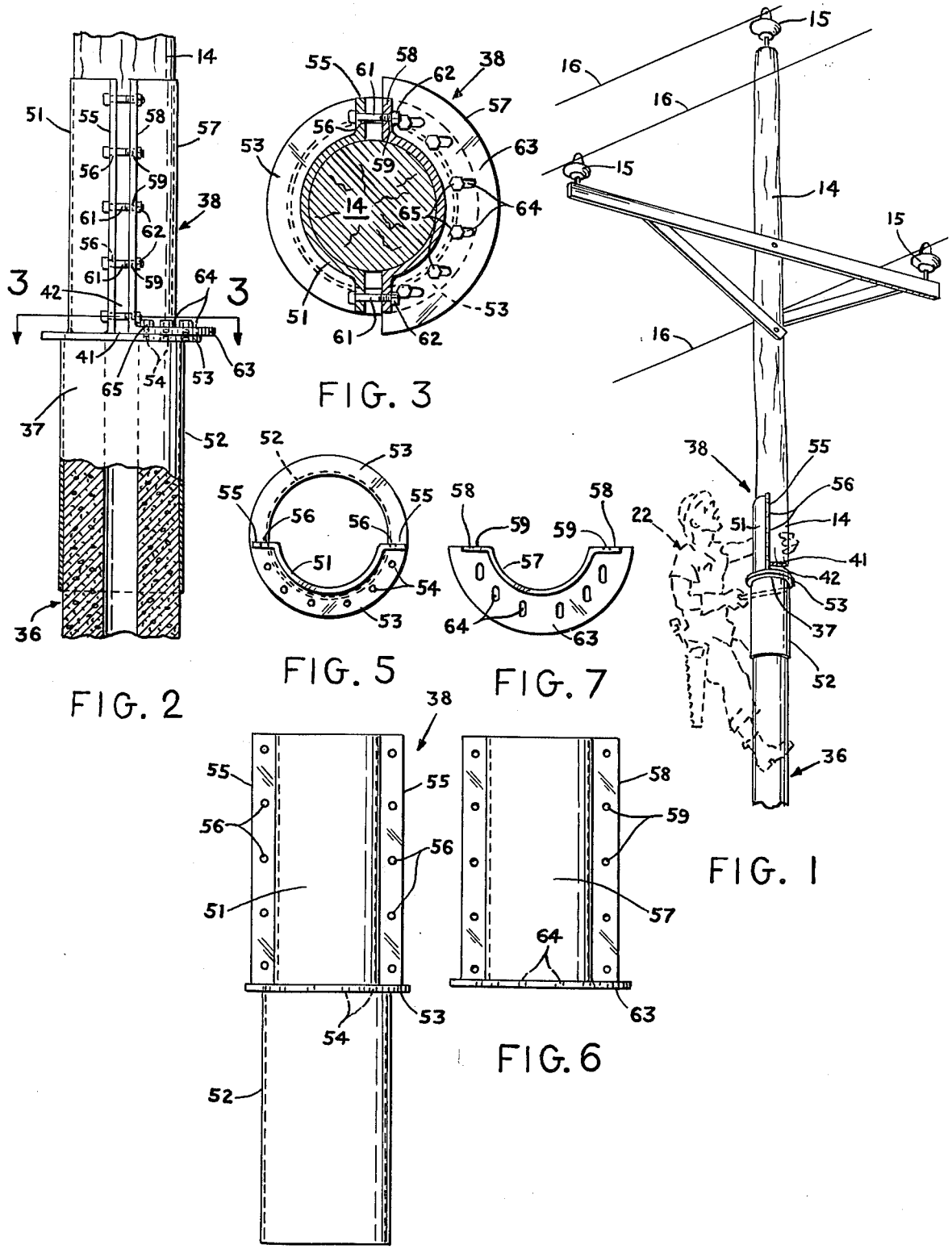

SLOTTED FLANGE CONNECTOR USEABLE IN A METHOD FOR REPLACING AN EXISTING UTILITY POLE WITHOUT DISTURBING HARDWARE MOUNTED THEREON

BACKGROUND OF INVENTION

As has been pointed out in U.S. Pat. No. 3,911,548, utility poles are subject to damage and deterioration, so it is desirable to provide for convenient replacement thereof.

Hardware connections to distal ends of utility poles represent expensive equipment and highly skilled workmanship, performed sometimes in hazardous conditions. Accordingly, it is desirable to replace utility poles in such a way as to avoid necessity for reworking such hardware and to avoid interruptions of service resulting therefrom. Convenient and inexpensive means also have been desirable to alter the elevation and/or alignment of such hardware relative to the earth.

Availability of materials for utility poles and economics relating thereto dictate frequently that a new pole be of a different material (such as wood, steel, aluminum, prestressed or reinforced concrete or resin bonded glass fibers) from that of the existing utility pole which is being replaced.

BRIEF STATEMENT OF INVENTION

The present invention solves the stated problems and other problems of the prior art in a useful, novel, unobvious and particularly facile way. A connector is presented for use in a method for replacing an existing utility pole, without disturbing hardware mounted thereon. In this method the utility pole comprises a proximal section having a bottom end attached to the earth and a distal section having hardware thereon. A new pole section is attached to the earth. The distal section of the existing pole (with the hardware intact thereon) is severed from the proximal section of the existing pole. The distal section then is connected to project from the new pole section. The connector according to this invention includes closure plates which complement each other to form a cylindrical enclosure about one of the pole sections. One of the closure plates preferably is fixed and the other is moveable. Movement is provided by means of bolts. The moveable closure plate preferably has a first terminal flange which engages a second terminal flange connected to the other pole section. Securing of the moveable plate is by means of bolts through slotted bolt holes.

The new pole section may have a length substantially the same as the proximal section of the existing utility pole, whereby the hardware will be restored approximately to its original elevation above the earth. Or the new pole section may have a different length from that of the proximal pole section, whereby the elevation of the hardware may be changed.

The proximal section may first be severed from the earth so as to leave a stump section protruding from the earth and so as to define a bottom end of the proximal section. Then the proximal section may be arranged vertically adjacent the stump section with the bottom end of the proximal section on the earth for supporting temporarily the distal section. During the severing of the distal section from the proximal section and the connecting of the distal section to the new pole section, the distal section is supported independently for example by means of a crane.

The new pole section can be of any otherwise suitable pole material (including but not necessarily limited to wood, steel, aluminum, prestressed or reinforced concrete or resin bonded glass fibers) as can be the existing pole (but which in most instances is made of wood). Preferably the new pole section is of prestressed concrete and formed hollow so that among other things a grounding line between a distal section and the earth may be provided therewithin.

Hydraulic jacking is a convenient way of removing the stump section and the hole vacated thereby (with or without augering) is useful for implanting the new pole section therein.

Alternately the new pole section can be erected adjacent the old pole and, after severing the distal section (with the hardware intact thereon) from the proximal section of the old pole, the distal section can be mounted on the new pole section. Thereafter the proximal section of the old pole can be removed.

Accordingly one object of this invention is to allow convenient, inexpensive, rapid and safe replacement of damaged or deteriorated utility poles.

Another object of this invention is to allow replacement of utility poles, without having to rework hardware thereon and without interruption of service.

Still another object of this invention is to provide for convenient altering of the height and/or alignment of hardware on the utility pole.

Still another object of this invention is to accommodate use of a same material or an otherwise suitable different material for new pole sections relative to the material of the existing pole.

Still another object of this invention is to allow for the proximal section of the existing pole first being severed from the earth, so as to leave a stump section protruding from the earth, and so as to define a bottom end of the proximal section. Then the proximal section may be arranged vertically adjacent the stump section with the bottom end of the proximal section on the earth for supporting temporarily the distal section.

Still another object of this invention is preferably to use new pole sections of prestressed concrete which may be made hollow and which can accommodate therewithin a connecting line between the distal section and the earth to provide positive grounding to the earth.

Still another object of this invention is to provide a connector which includes closure plates which complement each other to form a cylindrical enclosure about one of the pole sections. One of the closure plates preferably is fixed and the other is moveable. Movement is provided by means of bolts. The moveable closure plate has a terminal flange which engages a flange connected to the other pole section. Securing of the moveable plate preferably is by means of bolts through slotted bolt holes.

BRIEF DESCRIPTION OF DRAWING

The foregoing and other objects, features and advantages will appear more fully from an accompanying drawing, viewed in conjunction with a detailed description of a preferred embodiment of this invention and viewed with claims which follow. In the drawing same numerals refer to like elements throughout and:

FIG. 1 is a schematic illustration (comparable to FIG. 6 of U.S. Pat. No. 3,911,548) of a distal section of a pole with its hardware intact thereon being positioned on a new pole section. A truck boom (not shown) could be a means to accomplish this insertion).

FIG. 2 is a partially broken sectional view of a connector according to this invention mounted on a reinforced concrete new pole section and supporting a wooden distal section.

FIG. 3 is a sectional view taken along line 3—3 of FIG. 2.

FIG. 4 is a side view of a fixed closure plate connected to an apron which is mountable on a new pole section.

FIG. 5 is a top view of FIG. 4.

FIG. 6 is a side view of a moveable closure plate of the connector.

FIG. 7 is a top view of FIG. 6.

DESCRIPTION OF PREFERRED EMBODIMENTS

As taught in U.S. Pat. No. 3,911,548 and more particularly in FIGS. 1-8 thereof taken in sequential order, a method is illustrated for replacing a damaged or deteriorated utility pole having a proximal section attached to the earth and a distal section 14 having hardware 15 thereon and on which utility wires 16 are strung. Replacement of the pole does not require disturbing of the hardware 15 on the distal section 14 and replacement of the pole can be accomplished readily without any interruption of service, as described in U.S. Pat. No. 3,911,548.

As can be seen in FIG. 1 of this application, a new pole section 36 has a distal end 37 onto which is fastened a connector described generally as 38. The old pole section is severed at 41 and it has a proximal end 42 which is guided into the connector 38 by a workman 22, with assistance of suitable lifting equipment (not shown). The workman 22 then completes the connection. The workman 22 uses conventional means for supporting himself as he performs his work.

The connector of this disclosure, designated generally 38, preferably comprises essentially a fixed closure plate 51, shown best in FIGS. 4 and 5. The fixed closure plate 51 is shown connected to an apron 52 which is fastenable to the new pole section 36 by grouting or casting in the case of prestressed or reinforced concrete new pole sections. For other pole materials, other means for fastening the fixed closure plate 51 to the new pole section 36 may be ued. The apron 52 may be formed integrally with the fixed closure plate as shown here or the apron and the fixed closure plate may be separate parts fastened together by known means. The apron 52 has an outwardly projecting second terminal flange 53 positionable at the upper end 37 of the new pole section 36. Bolt holes 54 are provided through the second terminal flange 53. The fixed closure plate 51 is formed at its sides in vertical flanges 55 which are provided with bolt holes 56.

A moveable closure plate 57, shown best in FIGS. 6 and 7, is substantially complementary to the fixed closure plate 51 for completing a cylindrical enclosure adapted to engage the bottom end 42 of the distal pole section 14. The moveable closure plate 57 is formed at its sides in vertical flanges 58 which are provided with bolt holes 59. Movement of the moveable closure plate 57 toward the fixed closure plate 51 to engage the bottom end 42 of the distal pole section 14 is accomplished by turning on bolts 61 which threadably engage nuts 62. The foregoing is seen best from FIG. 2. Thusly the moveable closure plate 57 engages the distal pole section 14 between itself and the fixed closure plate 51.

The moveable closure plate 57 is provided with a first terminal flange 63 projecting outwardly at the end 42 of the distal pole section 14. The first terminal flange 63 is provided with slotted bolt holes 64, the slots 64 being arranged in the direction of movement of the moveable closure plate 57. By this expedient movement of the moveable closure plate 57 is facilitated, then the moveable closure plate 57 is fixed securely to the second terminal flange 53 and thus to the apron 52 and the new pole section 36 by means of bolts 65. If desired, the slotted bolt holes 64 could be provided as the holes 54 in the second terminal flange 53, instead of holes 64 in the first terminal flange 63.

To minimize lifting requirements and accommodate facile positioning of the distal pole section 14 in the connector 38, as seen in FIG. 1, moveable closure plate 57 preferably is removed while the distal pole section 14 is positioned in the connector 38.

Various materials for poles and connectors may be interchanged as can be materials used for grouting, gluing and the like within the context of this invention. It will be apparent also to those skilled in manufacturing, erecting and repairing of utility poles that wide deviations may be made from the shown embodiments, without departing from a main theme of invention delineated in claims which follow.

We claim:

1. A connector for splicing axially butting ends of a first and a second pole section, said connector comprising:
    a first closure plate in the form of an arc of a cylinder adapted to embrace a first of said pole sections at its said end,
    a second closure plate complementary to said first closure plate and movable with respect thereto for completing a generally cylindrical assembly adapted to engage said first pole section,
    closure means for moving said second closure plate between an open position wherein it is spaced from said first closure plate and said first pole section, and a closed position wherein it is adapted to engage said first pole section between itself and said first closure plate,
    said second closure plate having a first terminal flange projecting radially outwardly therefrom,
    a second terminal flange adapted to be secured to said second pole section adjacent said end thereof and projecting radially outwardly therefrom,
    said first terminal flange being securable to said second terminal flange by means of bolts, parallel slot-shaped bolt holes in at least one of said first terminal flange and the portion of said second terminal flange adjacent thereto, having major axes disposed parallel with the direction of movement of said second closure plate from said open position to said closed position and arranged to receive said bolts, wherein said first closure plate and said second closure plate both terminate at their respective sides in vertical flanges, and further comprising closure bolts screwably engageable with said vertical flanges to serve as said closure means.

2. The connector of claim 1, wherein the slot-shaped bolt holes are provided in said first terminal flange.

3. The connector of claim 1 with the first closure plate fixed relative to said second flange means.

4. In combination, a connector mounted on a new pole section, for use in a method for replacing an old erected utility pole, with the old erected utility pole comprising a proximal pole section having a bottom end attached to the earth and a distal pole section having hardware mounted thereon, without disturbing the hardware, with the method comprising the steps of:

severing the distal section of the old erected pole from the proximal pole section thereby providing the distal pole section with a bottom end, temporarily supporting the severed distal pole section, removing the proximal section of the old erected pole, providing the new pole section having an upper end with said connector mounted thereon, attaching the new pole section with said connector mounted thereon to the earth appropriately located and adapted for receiving the distal section of the old pole in said connector, and connecting the distal section of the old erected pole to project from the new pole section;

the connector comprising:

a first closure plate in the form of an arc of a cylinder adapted to embrace a first of said pole sections at its said end, a second closure plate complementary to said first closure plate and movable with respect thereto for completing a generally cylindrical assembly adapted to engage said first pole section, closure means for moving said second closure plate between an open position wherein it is spaced from said first closure plate and said first pole section, and a closed position wherein it is adapted to engage said first pole section between itself and said first closure plate, said second closure plate having a first terminal flange projecting radially outwardly therefrom, a second terminal flange adapted to be secured to said second pole section adjacent said end thereof and projecting radially outwardly therefrom, said terminal flange being securable to said second terminal flange by means of bolts, parallel slot-shaped bolt holes in at least one of said first terminal flange and the portion of said second terminal flange adjacent thereto, having major axes disposed parallel with the direction of movement of said second closure plate from said open position to said closed position and arranged to receive said bolts, wherein said first closure plate and said second closure plate both terminate at their respective sides in vertical flanges, and further comprising closure bolts screwably engageable with said vertical flanges to serve as said closure means.

5. The combination of claim 4, wherein the slot-shaped bolt holes are provided in said first terminal flange.

6. The combination of claim 4, with the first closure plate fixed relative to said second flange means.

* * * * *

UNITED STATES PATENT AND TRADEMARK OFFICE
CERTIFICATE OF CORRECTION

PATENT NO. : 4,066,372
DATED : January 3, 1978
INVENTOR(S) : Harold V. Swanson and Jorge E. Forero It is certified that error appears in the above-identified patent and that said Letters Patent are hereby corrected as shown below:

In the ABSTRACT, lines 8-9 delete [approximately] and insert appropriately therefor.

In Column 3, line 47, delete [ued] and insert used therefor.

In Column 6, line 12, after "said" insert first.

Signed and Sealed this

Twenty-ninth Day of August 1978

[SEAL]

Attest:

RUTH C. MASON
Attesting Officer

DONALD W. BANNER
Commissioner of Patents and Trademarks